US011122607B2

(12) United States Patent
Söderlund et al.

(10) Patent No.: US 11,122,607 B2
(45) Date of Patent: Sep. 14, 2021

(54) RESOURCE SCHEDULING FOR UPLINK REPORTING

(71) Applicant: Telefonaktiebolaget LM Ericsson (publ), Stockholm (SE)

(72) Inventors: Annie Söderlund, Sollentuna (SE); Björn Boström, Bromma (SE); Anders Forssell, Uppsala (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 76 days.

(21) Appl. No.: 16/086,110

(22) PCT Filed: Jul. 2, 2018

(86) PCT No.: PCT/SE2018/050720
§ 371 (c)(1),
(2) Date: Jan. 9, 2020

(87) PCT Pub. No.: WO2020/009624
PCT Pub. Date: Jan. 9, 2020

(65) Prior Publication Data
US 2020/0214028 A1     Jul. 2, 2020

(51) Int. Cl.
*H04W 72/12* (2009.01)
*H04B 7/06* (2006.01)
(Continued)

(52) U.S. Cl.
CPC ...... *H04W 72/1284* (2013.01); *H04B 7/0626* (2013.01); *H04L 5/0055* (2013.01);
(Continued)

(58) Field of Classification Search
CPC ......... H04W 72/1284; H04W 72/0446; H04W 72/1268; H04W 72/0413; H04B 7/0626; H04L 5/0055
(Continued)

(56) References Cited

U.S. PATENT DOCUMENTS

2006/0252443 A1* 11/2006 Sammour ............. H04W 8/186
455/518
2016/0080115 A1* 3/2016 Josiam ................. H04L 1/1854
370/329
(Continued)

FOREIGN PATENT DOCUMENTS

TW          201801547 A       1/2018

OTHER PUBLICATIONS

"Summary of remaining issues on CSI reporting", 3GPP TSG RAN WG1 Meeting #92bis; R1-1803635; Sanya, China, Apr. 16-20, 2018, pp. 1-12.
(Continued)

*Primary Examiner* — Danh C Le
(74) *Attorney, Agent, or Firm* — Murphy, Bilak & Homiller, PLLC (57) ABSTRACT

There is provided mechanisms for scheduling resource IDs for uplink reporting from a wireless device. A method is performed by a network node. The method comprises configuring, upon connection setup of the wireless device, the wireless device with one N-tuple of resource IDs. The N-tuple of resource IDs is assigned to the wireless device for uplink reporting. The N-tuple of resource IDs is selected from a data structure holding a plurality of N-tuples of resource IDs, each of which defining a unique combination of the resource IDs. The method comprises selecting, upon downlink scheduling of the wireless device, one of the resource IDs of the configured N-tuple of resource IDs. The method comprises providing information to the wireless device about the selected resource ID.

22 Claims, 7 Drawing Sheets

(51) Int. Cl.
*H04L 5/00* (2006.01)
*H04W 72/04* (2009.01)

(52) U.S. Cl.
CPC ... *H04W 72/0413* (2013.01); *H04W 72/0446* (2013.01); *H04W 72/1268* (2013.01)

(58) Field of Classification Search
USPC .......................... 370/329, 310.2; 455/450.1
See application file for complete search history.

(56) References Cited

U.S. PATENT DOCUMENTS

| | | | | |
|---|---|---|---|---|
| 2016/0135014 | A1* | 5/2016 | Alharayeri | H04W 8/18 455/456.3 |
| 2016/0173404 | A1* | 6/2016 | Pouyllau | H04L 41/5019 709/226 |
| 2017/0127441 | A1* | 5/2017 | Chandrasekhar | H04L 47/26 |
| 2018/0027550 | A1 | 1/2018 | Berggren | |
| 2018/0054282 | A1* | 2/2018 | Wang | H04W 72/1268 |
| 2019/0174407 | A1* | 6/2019 | Sammour | H04W 4/08 |
| 2019/0215242 | A1* | 7/2019 | Cady | H04L 45/74 |
| 2019/0229903 | A1* | 7/2019 | Balasubramanian | H04L 9/0861 |
| 2019/0327066 | A1 | 10/2019 | Gao et al. | |
| 2020/0107357 | A1* | 4/2020 | Chang | H04W 72/048 |
| 2020/0184491 | A1* | 6/2020 | Rodkey | G06F 16/00 |

OTHER PUBLICATIONS

"On Pucch Resource Allocation", 3GPP TSG.RAN WG1 Meeting RAN1#91; R1-1721006; Reno, Nevada, Nov. 27-Dec. 1, 2017, pp. 1-11.
"Summary of remaining issues on CSI reporting", 3GPP TSG RAN WG1 Meeting #92bis; R1-180635; Sanya, China, Apr. 16-20, 2018, pp. 1-12.
"3GPP TS 36.211 V15.1.0", 3rd Generation Partnership Project; Technical Specification Group Radio Access Network; Evolved Universal Terrestrial Radio Access (E-UTRA); Physical channels and modulation (Release 15), Mar. 2018, pp. 1-221.
"3GPP TS 38.211 V15.1.0", 3rd Generation Partnership Project; Technical Specification Group Radio Access Network; NR; Physical channels and modulation (Release 15), Mar. 2018, pp. 1-90.
"3GPP TS 38.212 V15.1.0", 3rd Generation Partnership Project; Technical Specification Group Radio Access Network; NR; Multiplexing and channel coding (Release 15), Mar. 2018, pp. 1-94.
"3GPP TS 38.331 V15.1.0 (Mar. 2018)", 3rd Generation Partnership Project; Technical Specification Group Radio Access Network; NR; Radio Resource Control (RRC) protocol specification (Release 15), Mar. 2018, pp. 1-268.

* cited by examiner

| PUCCH Resource Combination Index | PUCCH Resource ID Indicators | | | |
|---|---|---|---|---|
| | 00 | 01 | 10 | 11 |
| | Resource IDs per PUCCH Resource Set | | | |
| 1 | 1 | 2 | 3 | 4 |
| 2 | 1 | 2 | 3 | 5 |
| 3 | 1 | 2 | 3 | 6 |
| 4 | 1 | 2 | 3 | 7 |
| 5 | 1 | 2 | 3 | 8 |
| 6 | 1 | 2 | 4 | 5 |
| 7 | 1 | 2 | 4 | 6 |
| 8 | 1 | 2 | 4 | 7 |
| 9 | 1 | 2 | 4 | 8 |
| 10 | 1 | 2 | 5 | 6 |
| 11 | 1 | 2 | 5 | 7 |
| 12 | 1 | 2 | 5 | 8 |
| 13 | 1 | 2 | 6 | 7 |
| 14 | 1 | 2 | 6 | 8 |
| 15 | 1 | 2 | 7 | 8 |
| 16 | 1 | 3 | 4 | 5 |
| 17 | 1 | 3 | 4 | 6 |
| 18 | 1 | 3 | 4 | 7 |
| 19 | 1 | 3 | 4 | 8 |
| 20 | 1 | 3 | 5 | 6 |
| - | - | - | - | - |
| - | - | - | - | - |
| - | - | - | - | - |
| 67 | 4 | 5 | 6 | 8 |
| 68 | 4 | 5 | 7 | 8 |
| 69 | 4 | 6 | 7 | 8 |
| 70 | 5 | 6 | 7 | 8 |

| PUCCH Resource Combination Index | PUCCH Resource ID Indicators | | | |
|---|---|---|---|---|
| | 00 | 01 | 10 | 11 |
| | Resource IDs per PUCCH Resource Set | | | |
| 1 | 1 | 2 | 3 | 4 |
| 2 | 1 | 2 | 3 | 5 |
| 3 | 1 | 2 | 3 | 6 |
| 4 | 1 | 2 | 3 | 7 |
| 5 | 1 | 2 | 3 | 8 |
| 6 | 1 | 2 | 4 | 5 |
| 7 | 1 | 2 | 4 | 6 |
| 8 | 1 | 2 | 4 | 7 |
| 9 | 1 | 2 | 4 | 8 |
| 10 | 1 | 2 | 5 | 6 |

| UE1 | 00 | 01 | 10 | 11 |
|---|---|---|---|---|
| 1 | 1 | 2 | 3 | 4 |

| UE2 | 00 | 01 | 10 | 11 |
|---|---|---|---|---|
| 2 | 1 | 2 | 3 | 5 |

| UE3 | 00 | 01 | 10 | 11 |
|---|---|---|---|---|
| 3 | 1 | 2 | 3 | 6 |

| UE4 | 00 | 01 | 10 | 11 |
|---|---|---|---|---|
| 4 | 1 | 2 | 3 | 7 |

| UE5 | 00 | 01 | 10 | 11 |
|---|---|---|---|---|
| 5 | 1 | 2 | 3 | 8 |

RESOURCE SCHEDULING FOR UPLINK REPORTING

TECHNICAL FIELD

Embodiments presented herein relate to a method, a network node 200, a computer program, and a computer program product for scheduling resource IDs for uplink reporting from a wireless device.

BACKGROUND

In wireless communication networks, there may be a challenge to obtain good performance and capacity for a given communications protocol, its parameters and the physical environment in which the wireless communication network is deployed.

For example, one property for providing good performance and capacity for a given communications protocol in a wireless communication network is the ability for wireless devices to provide reports in the uplink to the network node in the wireless communication network that serves the wireless devices.

In general terms, in order for the network node to distinguish the uplink reports transmitted from different ones of the wireless devices in a same transmission time interval (TTI) and on the uplink control channel, the network node provides the wireless devices with a set of resource IDs to use for the specific transmission of the uplink reports. The resource ID should also enable the network node to identify the wireless device that sent the uplink report.

In this respect the network node might send a resource indicator to the wireless device that pinpoints which resource ID in the set of respurce IDs shall be used for the uplink reporting. This is for example done when the wireless device is scheduled in the downlink and needs to report feedback to the network node.

If all wireless devices would be provided unique resources, the whole uplink bandwidth would soon be occupied just with resources for uplink reporting. Further, these resources would most of the time not be used. Hence, this would result in a waste of resources. There is therefore a limited number of resource IDs that can be used to distinguish the different uplink reports and wireless devices that sent the uplink reports.

The resources for uplink reporting might instead be dimensioned by the number of needed resources such as for transmitting acknowledgment (ACK) or negative acknowledgement (NACK)) at each slot, i.e. how many wireless devices the network node will transmit to in the downlink and how many wireless devices will be scheduled for uplink reporting in this slot.

As an example, the wireless devices might be provided with resource IDs for such uplink reporting upon setup by means of radio resource control (RRC) configuration. As an example, each wireless device might be provided with a set of resource IDs defining physical resources to use for the uplink reporting. The resource IDs might be defined by a pucch-ResourceSetId and the resource IDs might be defined by set of PUCCH resource IDs, which refer to physical resources, and where PUCCH is short for physical uplink control channel and represents a logic control channel according to the Long Term Evolution (LTE) suite of telecommunications standards, see 3GPP TS 36.211, "Evolved Universal Terrestrial Radio Access (E-UTRA); Physical channels and modulation", version 15.1.0 and 3GPP TS 38.211, "NR; Physical channels and modulation" version 15.1.0 for telecommunications standards of the fifth generation (sometimes referred to as "New Radio" or simply "NR") telecommunications systems.

As an example, currently, for each pucch-ResourceSetId there can be up to eight PUCCH resources, i.e. eight PUCCH resource IDs. It is expected that this number will increase in later releases of the LTE and/or NR. A PUCCH resource indicator provided to each wireless device in a downlink control information (DCI) message will pinpoint the exact PUCCH resource ID within the given pucch-ResourceSetId to be used by the wireless device for the corresponding uplink transmission.

However, in view of the above, there is still a need for an improved scheduling of resources to wireless devices to avoid that uplink reporting from different wireless devices clashes.

SUMMARY

An object of embodiments herein is to provide efficient scheduling resources for uplink reporting from a wireless device that does not suffer from the issues noted above, or at least where these issues are mitigated or reduced.

According to a first aspect there is presented a method for scheduling resource IDs for uplink reporting from a wireless device. The method is performed by a network node. The method comprises configuring, upon connection setup of the wireless device, the wireless device with one N-tuple of resource IDs. The N-tuple of resource IDs is assigned to the wireless device for uplink reporting. The N-tuple of resource IDs is selected from a data structure holding a plurality of N-tuples of resource IDs, each of which defining a unique combination of the resource IDs. The method comprises selecting, upon downlink scheduling of the wireless device, one of the resource IDs of the configured N-tuple of resource IDs. The method comprises providing information to the wireless device about the selected resource ID.

According to a second aspect there is presented a network node for scheduling resource IDs for uplink reporting from a wireless device. The network node comprises processing circuitry. The processing circuitry is configured to cause the network node to configure, upon connection setup of the wireless device, the wireless device with one N-tuple of resource IDs. The N-tuple of resource IDs is assigned to the wireless device for uplink reporting. The N-tuple of resource IDs is selected from a data structure holding a plurality of N-tuples of resource IDs, each of which defining a unique combination of the resource IDs. The processing circuitry is configured to cause the network node to select, upon downlink scheduling of the wireless device, one of the resource IDs of the configured N-tuple of resource IDs. The processing circuitry is configured to cause the network node to provide information to the wireless device about the selected resource ID.

According to a third aspect there is presented a network node for scheduling resource IDs for uplink reporting from a wireless device. The network node comprises a configure module configured to configure, upon connection setup of the wireless device, the wireless device with one N-tuple of resource IDs. The N-tuple of resource IDs is assigned to the wireless device for uplink reporting. The N-tuple of resource IDs is selected from a data structure holding a plurality of N-tuples of resource IDs, each of which defining a unique combination of the resource IDs. The network node comprises a select module configured to select, upon downlink scheduling of the wireless device, one of the resource IDs of the configured N-tuple of resource IDs. The network node comprises a provide module configured to provide information to the wireless device about the selected resource ID.

According to a fourth aspect there is presented a computer program for scheduling resource IDs for uplink reporting from a wireless device, the computer program comprising computer program code which, when run on a network node, causes the network node to perform a method according to the first aspect.

According to a fifth aspect there is presented a computer program product comprising a computer program according to the fourth aspect and a computer readable storage medium on which the computer program is stored. The computer readable storage medium could be a non-transitory computer readable storage medium.

Advantageously this method, these network nodes, this computer program, and this computer program product provide efficient scheduling resources for uplink reporting from the wireless device.

Advantageously the proposed scheduling of resources for uplink reporting from the wireless device does not suffer from the issues noted above, or at least where these issues are mitigated or reduced Advantageously the proposed scheduling of resources for uplink reporting from the wireless device enables the resources to be used in an optimal way.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
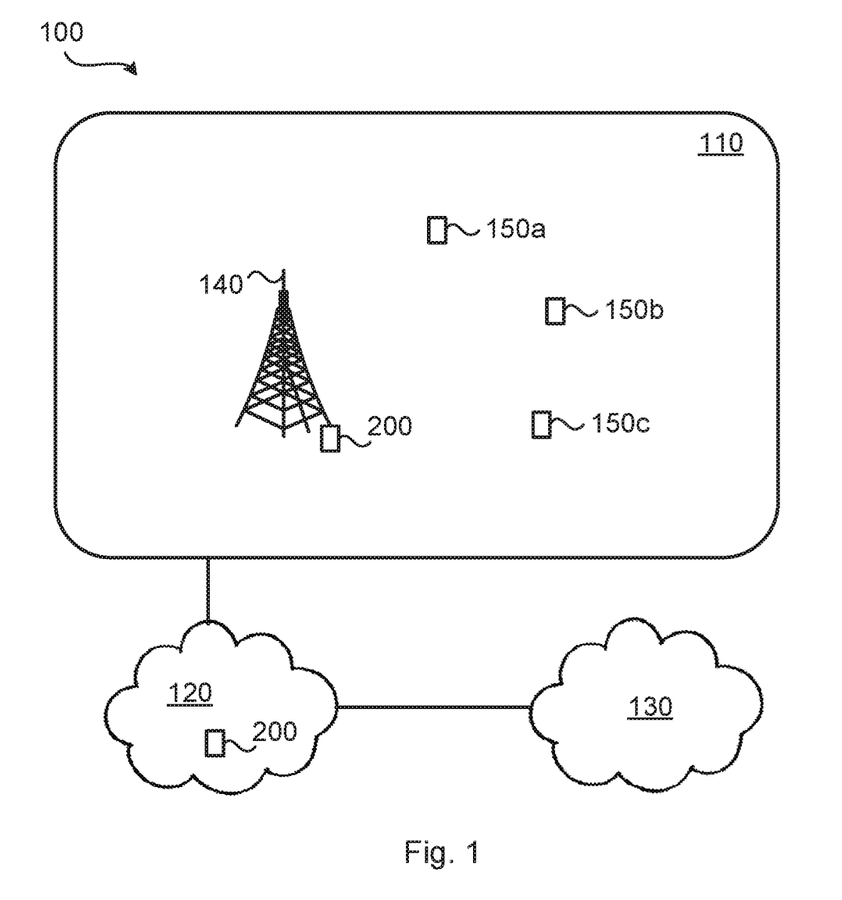
FIG. 1 is a schematic diagram illustrating a wireless communication network according to embodiments.

FIG. 1 is a schematic diagram illustrating a wireless communication network 100 where embodiments presented herein can be applied. The wireless communication network 100 could be a third generation (3G) telecommunications network, a fourth generation (4G) telecommunications network, or a fifth (5G) telecommunications network and support any 3GPP telecommunications standard, where applicable.

The wireless communication network 100 comprises a network node 200 configured to, via a radio access network node 140, provide network access to wireless devices 150a, 150b, 150c in a radio access network 110. The radio access network no is operatively connected to a core network 120. The core network 120 is in turn operatively connected to a service network 130, such as the Internet. The wireless devices 150a, 150b, 150c are thereby enabled to access services of, and exchange data with, the service network 130.

Examples of network nodes 200 are radio access network nodes, radio base stations, base transceiver stations, Node Bs, evolved Node Bs, g Node Bs, access points, and access nodes, and backhaul nodes. Examples of wireless devices 150a, 150b, 150c are mobile stations, mobile phones, handsets, wireless local loop phones, user equipment (UE), smartphones, laptop computers, tablet computers, network equipped sensors, network equipped vehicles, and so-called Internet of Things devices.

As disclosed above the wireless devices 150a, 150b, 150c should be enabled to provide reports in the uplink to the network node 200 in the wireless communication network 100. The wireless devices 150a, 150b, 150c therefore need to be configured with resource IDs for such uplink reporting According to an illustrative example, assume that the number of available PUCCH resource IDs is 8, that there are 9 wireless devices (denoted UE1, UE2, . . . , UE9) served by the network node, and that the number of wireless devices the network node is scheduled to transmit to per slot in the downlink is 5. Assume further that the wireless devices are configured with the following PUCCH resource IDs:

UE1: 1, 2, 3, 4; UE2: 2, 3, 4, 5; UE3: 3, 4, 5, 6; UE4; 4, 5, 6, 7; UE5: 5, 6, 7, 8;

UE6: 6, 7, 8, 1; UE7: 7, 8, 1, 2; UE8: 8, 1, 2, 3; and UE9: 1, 2, 3, 4.

Assume further that the five wireless devices UE1-UE4, UE9 all have been scheduled to transmit in the same downlink slot. However, since all the PUCCH resource IDs that can be used for the wireless device UE9 are already occupied by the wireless devices UE1-UE4, the wireless device UE9 will not get any PUCCH resources, even though there are unused PUCCH resource IDs left, i.e. 5, 6, 7 and 8.

An object of embodiments herein is to provide efficient scheduling resource IDs for uplink reporting from a wireless device that does not suffer from the issues noted above, or at least where these issues are mitigated or reduced.

The embodiments disclosed herein therefore relate to mechanisms for scheduling resource IDs for uplink reporting from a wireless device 150a. In order to obtain such mechanisms there is provided a network node 200, a method performed by the network node 200, a computer program product comprising code, for example in the form of a computer program, that when run on a network node 200, causes the network node 200 to perform the method.

Figure 2:
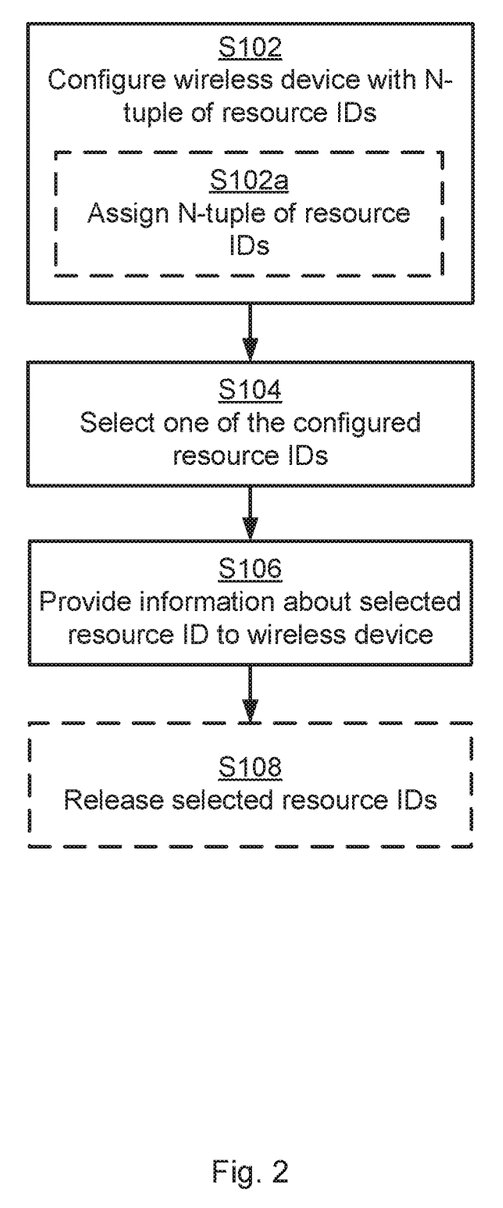
FIG. 2 is a flowchart of methods according to embodiments.

FIG. 2 is a flowchart illustrating embodiments of methods for scheduling resource IDs for uplink reporting from a wireless device 150a. The methods are performed by the network node 200. The methods are advantageously provided as computer programs 920.

S102: The network node 200 configures, upon connection setup of the wireless device 150a, the wireless device 150a with one N-tuple of resource IDs. The N-tuple of resource IDs is assigned to the wireless device 150a for uplink reporting. The N-tuple of resource IDs is selected from a data structure 300a, 300b, 300c holding a plurality of N-tuples of resource IDs. Each plurality of N-tuples of resource IDs defines a unique combination of the resource IDs.

Figure 3:
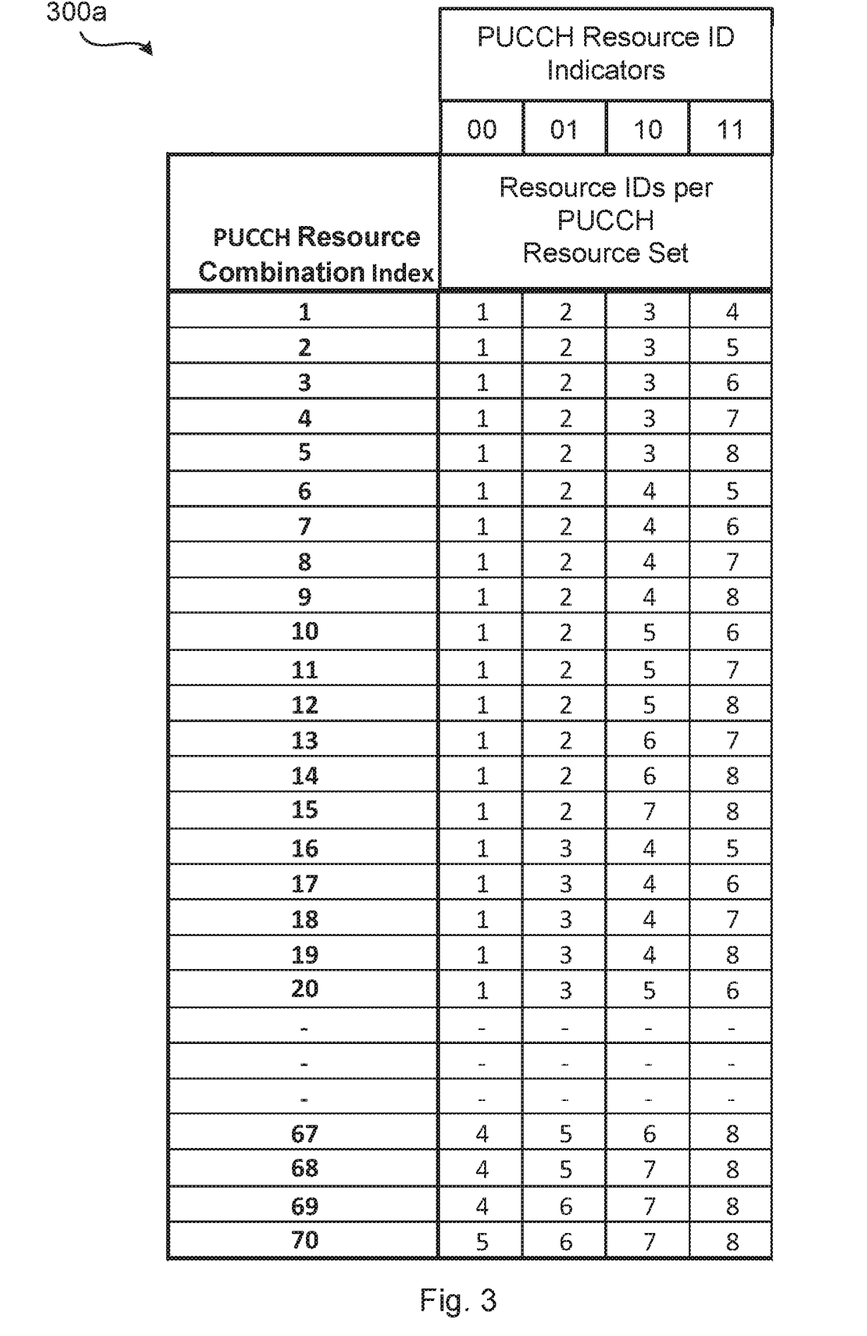
FIGS. 3, 4, and 5 schematically illustrate data structures holding a plurality of N-tuples of resource IDs according to embodiments.
Figure 4:
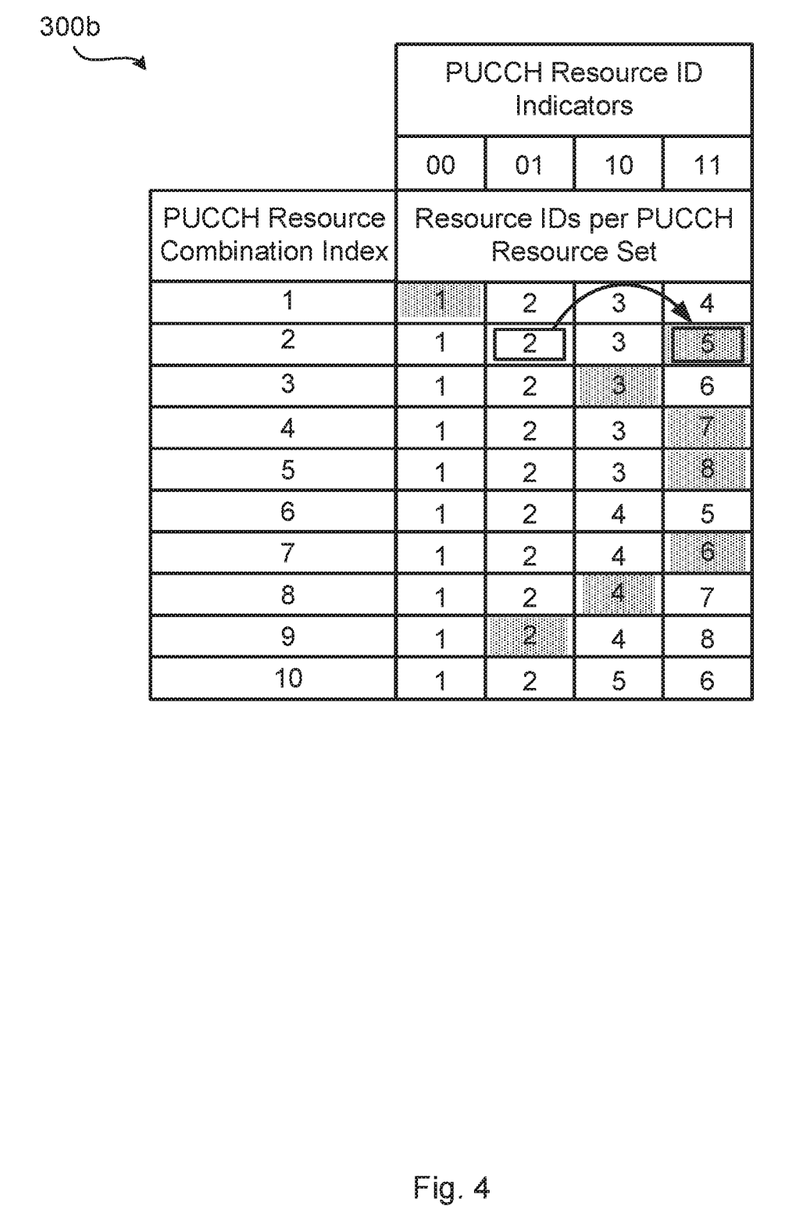
Figure 5:
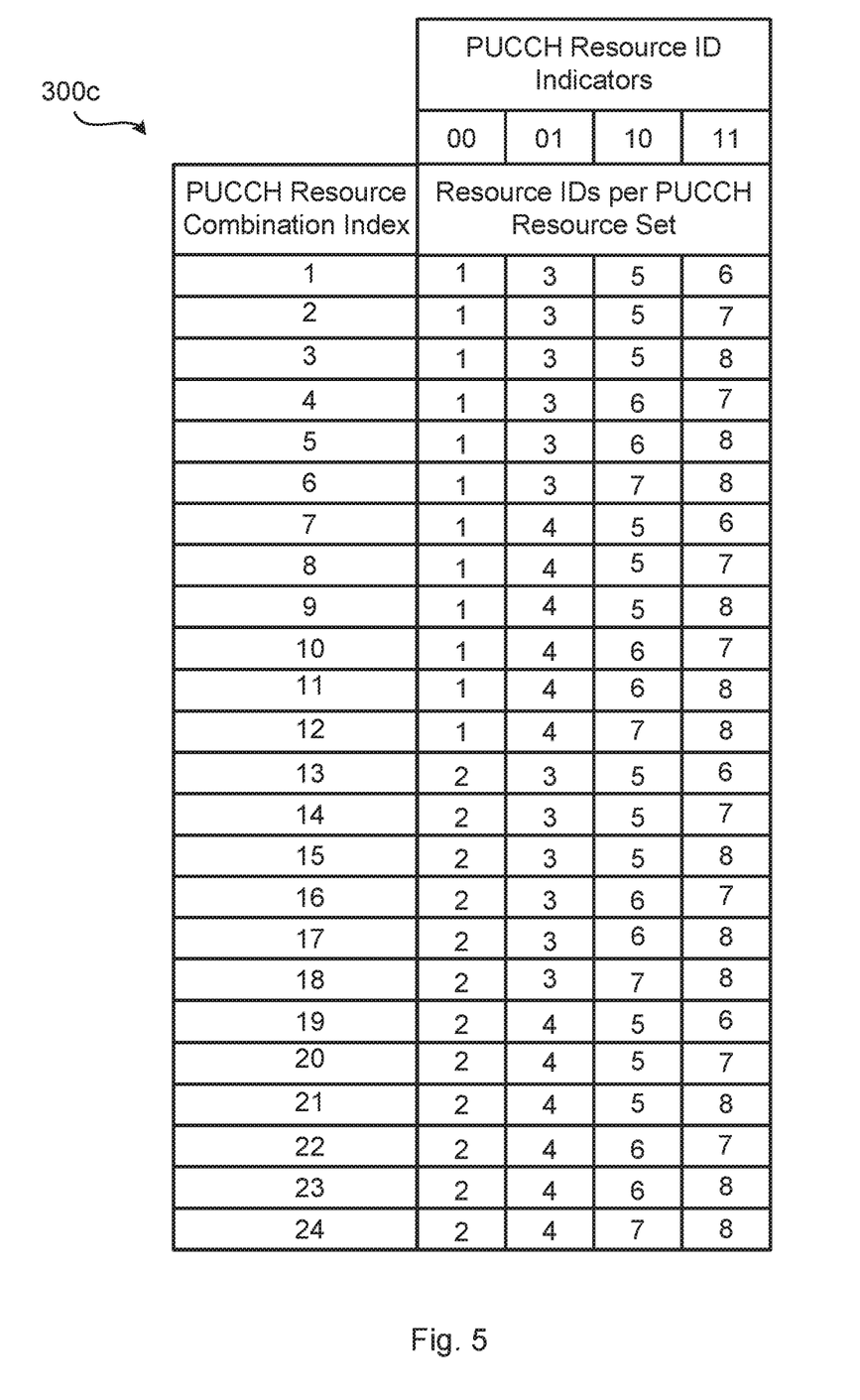

Intermediate reference is here made to FIGS. 3, 4, and 5 schematically illustrating data structures 300a, 300b, 300c, each holding a plurality of N-tuples of resource IDs. In FIGS. 3, 4, and 5 each data structures 300a, 300b, 300c is represented by a PUCCH resource combination list and each N-tuple of resource IDs is represented by a PUCCH resource combination, and each N-tuple of resource IDs is indexed by a PUCCH resource combination index.

S104: The network node 200 selects, upon downlink scheduling of the wireless device 150a, one of the resource IDs of the configured N-tuple of resource IDs.

S106: The network node 200 provides information to the wireless device 150a about the selected resource ID.

Embodiments relating to further details of scheduling resource IDs for uplink reporting from a wireless device 150a as performed by the network node 200 will now be disclosed.

There may be different ways for the N-tuple of resource IDs to be selected from the data structure 300a, 300b, 300c.

In some aspects each N-tuple of resource IDs in the data structure 300a, 300b, 300c is addressed by a respective index. Then, according to an embodiment the network node 200 is configured to perform (optional) step S102a:

S102a: The network node 200 assigns the N-tuple of resource IDs by selecting an index to the data structure 300a, 300b, 300c.

In some aspects step S102a is part of step S102.

In further aspects, the wireless device 150a is configured with a free available N-tuple of resource IDs. That is, according to an embodiment, when some, but not all of the plurality of N-tuples of resource IDs have been assigned to any other wireless devices 150b, 150c, the wireless device 150a is configured with one of the N-tuple of resource IDs not already assigned to any other wireless devices 150b, 150c.

In further aspects, the wireless device 150a is configured with a first free available N-tuple of resource IDs. Particularly, according to an embodiment the wireless device 150a is configured with a first available one of the N-tuple of resource IDs not already assigned to any other wireless device 150b, 150c. The first available one of the N-tuple of resource IDs might be defined by the N-tuple of resource IDs with lowest index not assigned to any other wireless device 150b, 150c.

In further aspects, the wireless device 150a is configured with a free available N-tuple of resource IDs randomly selected among all free available N-tuple of resource IDs. That is, according to an embodiment the wireless device 150a is configured with a randomly selected one of the N-tuple of resource IDs not already assigned to any other wireless device 150b, 150c.

There could be different ways to handle scenarios where all possible N-tuples of resource IDs already are occupied.

In some aspects, one of the N-tuples of resource IDs having fewest occupants might be selected. That is, according to an embodiment, when all of the plurality of N-tuples of resource IDs have been assigned to other wireless devices 150b, 150c, the wireless device 150a is configured with one of the plurality of N-tuples of resource IDs which have been assigned to fewest of the other wireless devices 150b, 150c.

In other aspects, more resource can be allocated so as to expand the data structure 300a, 300b, 300c. That is, according to an embodiment, when all of the plurality of N-tuples of resource IDs have been assigned to other wireless devices 150b, 150c, the data structure 300a, 300b, 300c is expanded with at least one further N-tuple of resource IDs, and the wireless device 150a is configured with one of the at least one further N-tuple of resource IDs.

There could be different ways for the network node 200 to in step S104 select one of the resource IDs of the configured N-tuple of resource IDs for the wireless device 150a. In some aspects the network node 200 selects a resource ID that is freely available, i.e., not already occupied. That is, according an embodiment, one of the resource IDs is, in step S104, selected from the configured N-tuple of resource IDs not already selected for any other wireless device 150b, 150c. In some scenarios the wireless device 150a is scheduled in the same downlink slot as the other wireless device 150b, 150c. Particularly, according to an embodiment the so-called any other wireless device 150b, 150c and the wireless device 150a are scheduled in the same or adjacent downlink slot.

In some aspects, if needed, the network node 200 re-allocates resources IDs within a given combination of resource IDs for one or more wireless devices 150a, 150b, 150c in order to establish utilization of all available resource IDs. Particularly, according to an embodiment, when all resource IDs of the configured N-tuple of resource IDs already have been selected for other wireless devices 150b, 150c, the resource ID selected for one of these other wireless devices 150b, 150c is re-selected for the wireless device 150a, and another resource ID not already selected for yet another wireless device 150b, 150c is selected for this one of the other wireless devices 150b, 150c. In some scenarios the wireless device 150a is scheduled in the same downlink slot as the other wireless devices 150b, 150c. Particularly, according to an embodiment the other wireless devices 150b, 150c and the wireless device 150a are scheduled in same downlink slot.

Particular reference is here made to the data structure 300b of FIG. 4. In the illustrative example of FIG. 4, it is assumed that there are 8 wireless devices UE1, UE2, UE3, UE4, UE5, UE7, UE8, UE9 scheduled for uplink reporting in the same slot. Assume that each of the wireless devices UE1, UE2, UE3, UE4, UE5, UE7, UE8 already have been assigned to its own N-tuple of resource IDs UE1 is assigned PUCCH resource combination index 1, UE2 is assigned PUCCH resource combination index 2, UE3 is assigned PUCCH resource combination index 3, UE4 is assigned PUCCH resource combination index 4, UE5 is assigned PUCCH resource combination index 5, UE7 is assigned PUCCH resource combination index 7, and UE8 is assigned PUCCH resource combination index 8. Assume further that a respective one of the resource IDs of the configured N-tuple of resource IDs already has been selected for UE1, UE2, UE3, UE4, UE5, UE7, UE8 as illustrated in FIG. 4. That is, for UE1 is selected resource ID 1, for UE2 is selected resource ID 2, for UE3 is selected resource ID 3, for UE4 is selected resource ID 7, for UE5 is selected resource ID 8, for UE7 is selected resource ID 6, and for UE8 is selected resource ID 4. If UE 9 is assigned PUCCH resource combination index 9, then all the possible resource IDs 1, 2, 4, 8 at this index have already been selected for the other wireless devices. Therefore, the resource ID for UE2 is re-selected to be resource ID 5 such that resource ID 2 can be selected for UE9.

There could be different types of data structures 300a, 300b, 300c. Illustrative examples of data structures 300a, 300b, 300c are provided in FIGS. 3, 4, and 5. FIGS. 3, 4, and 5 are all examples of data structures 300a, 300b, 300c provided as ordered lists of N-tuples of resource IDs. FIG. 3 is an examples of a data structure 300a holding all the unique combinations of the resource IDs.

Particular reference is here made to the data structure 300b of FIG. 5. In one example the data structure 300c of FIG. 5 is utilized in a time division duplexing (TDD) scenario with three downlink slots and one uplink slot, resulting in that the data structure 300a of FIG. 3 can be drastically reduced, resulting in only 24 available unique combinations of the resource IDs needed in order to avoid collisions. As an example, two resource IDs (resource ID 1 and resource ID 2) are used for wireless devices scheduled in the first downlink slot, two resource IDs (resource ID 3 and resource ID 4) are used for wireless devices scheduled in the second downlink slot, and four resource IDs (resource ID 5, resource ID 6, resource ID 7, and resource ID 8) are used for wireless devices scheduled in the third downlink slot.

In some aspects one occurrence of the selecting as in step S104 is repeated every time the wireless device 150a is scheduled in the downlink. That is, according to an embodiment the selecting in step S104 is repeatedly performed at each downlink scheduling opportunity of the wireless device 150a.

In some aspects the resource IDs assigned to the wireless device 150a are released upon connection release of the wireless device 150a. That is, according to an embodiment the network node 200 is configured to perform (optional) step S108:

S108: The network node 200 releases, upon connection release of the wireless device 150a, the selected resource ID for making the selected resource ID available to be selected for another wireless device 150b, 150c.

Thereby the thus released resource can be assigned to another wireless device 150b, 150c, thus avoiding waste of unused resource IDs and thus resulting in efficient use of available resource IDs.

There could be different ways to select the value of N (i.e., from how many resource IDs the network node 200 can select the one resource ID in in step S104). In this respect, the limitation, as given by the value of N, with regards to how many resource IDs a wireless device 150a can be configured with from start generally owes to a limitation in the downlink signalling capacity. The value of N is typically selected as 2 n where n takes a value in the set {1, 2, 4, 6, 8, . . . }. In some aspects there are thus at least 4 resource IDs the network node 200 can select from. That is, according to an embodiment, in further detail, in some examples, N=4, N=8, N=16, or N=24. In the illustrative examples of FIGS. 3, 4, and 5, N=4. That is, in FIGS. 3, 4, and 5 there are 4 PUCCH resources per PUCCH Resource Set. In the non-limiting illustrative examples of FIGS. 3, 4, and 5, the value of N is selected to be 4 just to ease the presentation of the underlying principle.

There could be different ways to select the total number of available N-tuple of resource IDs. According to an embodiment, there are 70 N-tuples (as in FIG. 3). According to another embodiment, there are 24 N-tuples (as in FIG. 5). That is, in FIG. 3 there are 70 unique PUCCH Resource Combinations and in FIG. 5 there are 24 unique PUCCH Resource Combinations. In general terms, the total number of available N-tuple of resource IDs grows as N grows. But there could be different total number of available N-tuple of resource IDs for the same value of N. FIGS. 3 and 5 are examples of this where N=4 in both figures.

There could be different ways to define the resource ID. According to an embodiment each resource ID is defined by a physical resource. The physical resource might be a time/frequency resource of a physical resource block. In further aspects the resource ID might define a cyclic shift of a code sequence used to modulate the signalling of the uplink reporting, the starting physical resource block (PRB) for the signalling of the uplink reporting, and/or the number of symbols used for the signalling of the uplink reporting.

There could be different ways for the wireless device 150a to provide the uplink reporting. As disclosed above, the uplink reporting might be on a physical uplink control channel (PUCCH). Then, each N-tuple of resource IDs might define a PUCCH resource set. Further, each index might define a PUCCH resource combination index. For each cell, a PUCCH Resource Combination List might be created, where each PUCCH Resource Combination is unique, i.e. includes a unique combination of PUCCH Resources. In order to address each PUCCH Resource Combination, each PUCCH Resource Combination in the PUCCH Resource Combination List is assigned a PUCCH Resource Combination Index. In other words, the method defined by steps S102, S104, S106 enables a wireless device 150a to be configured with a PUCCH resource combination from a PUCCH resource combination list holding unique combinations of resource IDs, and upon downlink scheduling of the wireless device 150a, one of the resource IDs in the PUCCH resource combination is selected for the wireless device 150a.

There could be different types of uplink reportings. As disclosed above, the uplink reporting might pertain to acknowledgement (ACK) and negative acknowledgement (NACK) feedback. Further, the uplink reporting might pertain to reporting of channel state information (CSI).

Figure 6:
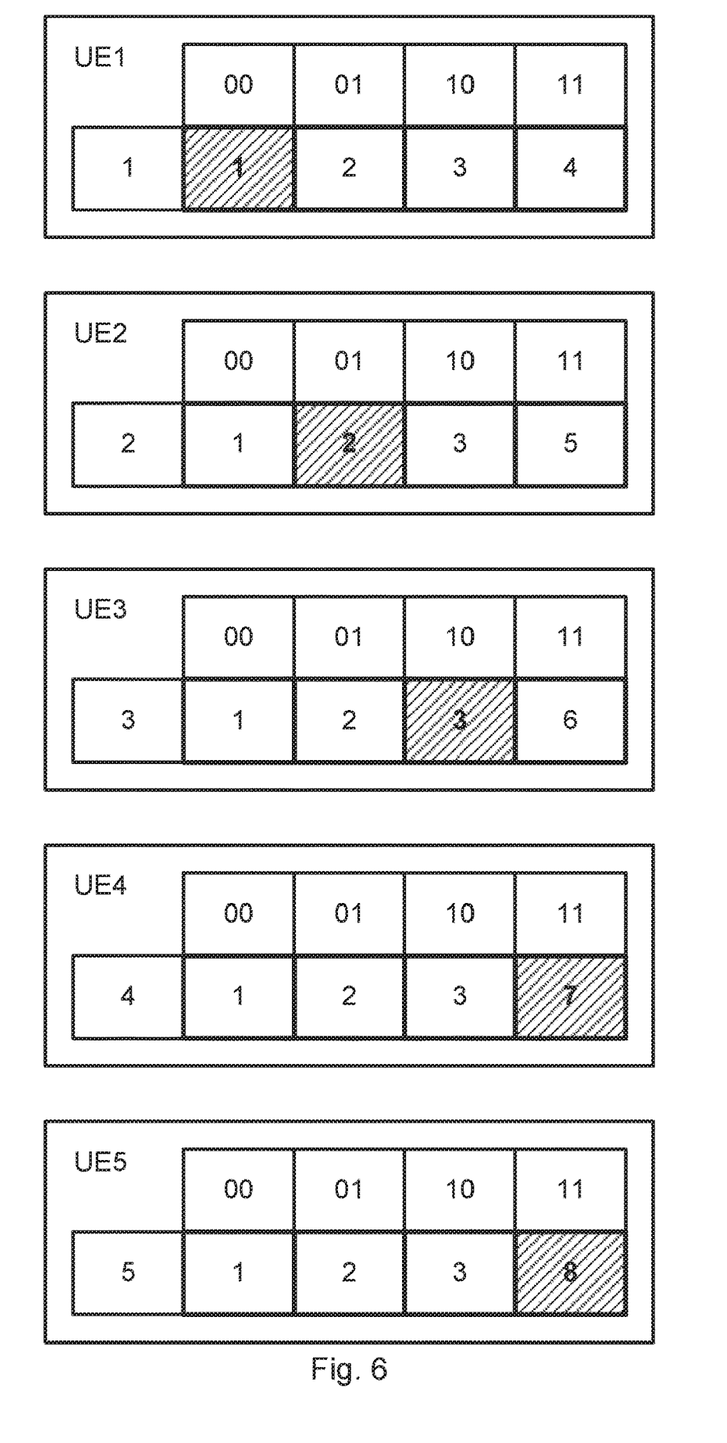
FIG. 6 schematically illustrates wireless devices configured with resources for uplink reporting according to an embodiment.

FIG. 6 schematically illustrates how 4 PUCCH Resource Sets have been assigned to five wireless devices UE1, UE2, UE3, UE4, UE5 from the data structure 300a in FIG. 3, and where the selected PUCCH resource ID is highlighted. That is, UE1 is assigned PUCCH resource combination index 1 with PUCCH resource ID 1 selected; UE2 is assigned PUCCH resource combination index 2 with PUCCH resource ID 2 selected; UE3 is assigned PUCCH resource combination index 3, with PUCCH resource ID 3 selected; UE4 is assigned PUCCH resource combination index 4 with PUCCH resource ID 7 selected; and UE5 is assigned PUCCH resource combination index 5 with PUCCH resource ID 8 selected.

Figure 7:
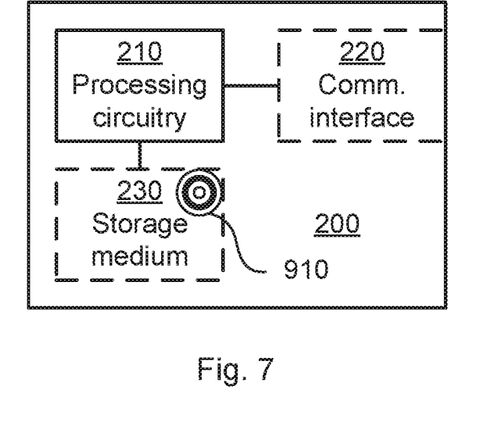
FIG. 7 is a schematic diagram showing functional units of a network node according to an embodiment.

FIG. 7 schematically illustrates, in terms of a number of functional units, the components of a network node 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 910 (as in FIG. 9), e.g. in the form of a storage medium 230. The processing circuitry 210 may further be provided as at least one application specific integrated circuit (ASIC), or field programmable gate array (FPGA).

Particularly, the processing circuitry 210 is configured to cause the network node 200 to perform a set of operations, or steps, as disclosed above. For example, the storage medium 230 may store the set of operations, and the processing circuitry 210 may be configured to retrieve the set of operations from the storage medium 230 to cause the network node 200 to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The network node 200 may further comprise a communications interface 220 at least configured for communications with other entities, nodes, functions, and devices of the wireless communication network 100. As such the communications interface 220 may comprise one or more transmitters and receivers, comprising analogue and digital components. The processing circuitry 210 controls the general operation of the network node 200 e.g. by sending data and control signals to the communications interface 220 and the storage medium 230, by receiving data and reports from the communications interface 220, and by retrieving data and instructions from the storage medium 230. Other components, as well as the related functionality, of the network node 200 are omitted in order not to obscure the concepts presented herein.

Figure 8:
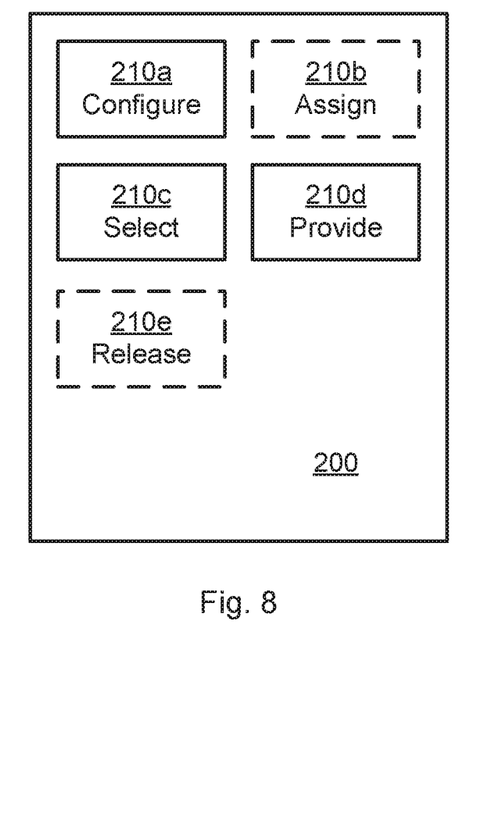
FIG. 8 is a schematic diagram showing functional modules of a network node according to an embodiment.

FIG. 8 schematically illustrates, in terms of a number of functional modules, the components of a network node 200 according to an embodiment. The network node 200 of FIG. 8 comprises a number of functional modules; a configure module 210a configured to perform step S102, a select module 210C configured to perform step S104, and a provide module 210d configured to perform step S106. The network node 200 of FIG. 8 may further comprise a number of optional functional modules, such as any of an assign module 210b configured to perform step S102a, and a release module 210e configured to perform step S108. In general terms, each functional module 210a-210e may in one embodiment be implemented only in hardware and in another embodiment with the help of software, i.e., the latter embodiment having computer program instructions stored on the storage medium 230 which when run on the processing circuitry makes the network node 200 perform the corresponding steps mentioned above in conjunction with FIG. 8. It should also be mentioned that even though the modules correspond to parts of a computer program, they do not need to be separate modules therein, but the way in which they are implemented in software is dependent on the programming language used. Preferably, one or more or all functional modules 210a-210e may be implemented by the processing circuitry 210, possibly in cooperation with the communications interface 220 and/or the storage medium 230. The processing circuitry 210 may thus be configured to from the storage medium 230 fetch instructions as provided by a functional module 210a-210e and to execute these instructions, thereby performing any steps as disclosed herein.

The network node 200 may be provided as a standalone device or as a part of at least one further device. For example, the network node 200 may be provided in a node of the radio access network no or in a node of the core network 120. Alternatively, functionality of the network node 200 may be distributed between at least two devices, or nodes. These at least two nodes, or devices, may either be part of the same network part (such as the radio access network no or the core network 120) or may be spread between at least two such network parts. In general terms, instructions that are required to be performed in real time may be performed in a device, or node, operatively closer to the cell than instructions that are not required to be performed in real time.

Thus, a first portion of the instructions performed by the network node 200 may be executed in a first device, and a second portion of the of the instructions performed by the network node 200 may be executed in a second device; the herein disclosed embodiments are not limited to any particular number of devices on which the instructions performed by the network node 200 may be executed. Hence, the methods according to the herein disclosed embodiments are suitable to be performed by a network node 200 residing in a cloud computational environment. Therefore, although a single processing circuitry 210 is illustrated in FIG. 7 the processing circuitry 210 may be distributed among a plurality of devices, or nodes. The same applies to the functional modules 210a-210e of FIG. 8 and the computer program 920 of FIG. 9.

Figure 9:
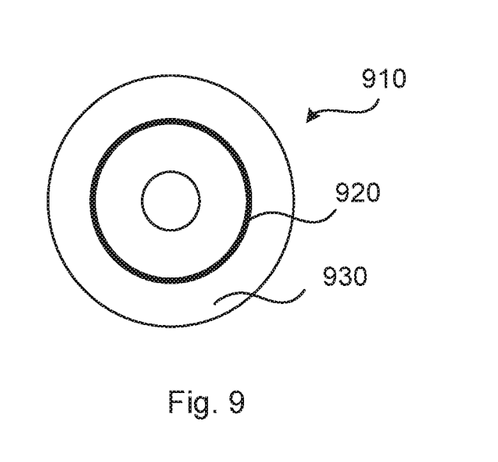
FIG. 9 shows one example of a computer program product comprising computer readable storage medium according to an embodiment.

FIG. 9 shows one example of a computer program product 910 comprising computer readable storage medium 930. On this computer readable storage medium 930, a computer program 920 can be stored, which computer program 920 can cause the processing circuitry 210 and thereto operatively coupled entities and devices, such as the communications interface 220 and the storage medium 230, to execute methods according to embodiments described herein. The computer program 920 and/or computer program product 910 may thus provide means for performing any steps as herein disclosed.

In the example of FIG. 9, the computer program product 910 is illustrated as an optical disc, such as a CD (compact disc) or a DVD (digital versatile disc) or a Blu-Ray disc. The computer program product 910 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 920 is here schematically shown as a track on the depicted optical disk, the computer program 920 can be stored in any way which is suitable for the computer program product 910.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for scheduling resource IDs for uplink reporting from a wireless device, the method performed by a network node and comprising:
upon connection setup of the wireless device, configuring the wireless device with one N-tuple of resource IDs, the N-tuple of resource IDs being assigned to the wireless device for uplink reporting, wherein the N-tuple of resource IDs is selected from a data structure holding a plurality of N-tuples of resource IDs, each N-tuple defining a unique combination of the resource IDs;

upon downlink scheduling of the wireless device, selecting one of the resource IDs of the configured N-tuple of resource IDs; and providing information to the wireless device about the selected resource ID.

2. The method according to claim 1, wherein each N-tuple of resource IDs in the data structure is addressed by a respective index, and the method further comprises assigning the N-tuple of resource IDs by selecting an index to the data structure.

3. The method according to claim 2, wherein each index defines a PUCCH resource combination index.

4. The method according to claim 1, wherein the one of the resource IDs is selected from the configured N-tuple of resource IDs not already selected for any other wireless device.

5. The method according to claim 4, wherein said any other wireless device comprises all other wireless devices scheduled in same or adjacent downlink slot as the wireless device.

6. The method according to claim 1, wherein, when all resources of the configured N-tuple of resource IDs already have been selected for other wireless devices, a particular resource ID selected for a particular one of the other wireless devices is re-selected for the wireless device, and a further resource ID not already selected any of the other wireless devices is selected for the particular one of the other wireless devices.

7. The method according to claim 6, wherein the other wireless devices and the wireless device are scheduled in same downlink slot.

8. The method according to claim 1, wherein the data structure is arranged as an ordered list of N-tuples of resource IDs.

9. The method according to claim 1, wherein the data structure holds all the unique combinations of the resource IDs.

10. The method according to claim 1, wherein, when some, but not all, of the plurality of N-tuples of resource IDs have been assigned to the other wireless devices, the wireless device is configured with one of the N-tuple of resource IDs that are not already assigned to any of the other wireless devices.

11. The method according to claim 10, wherein the wireless device is configured with a randomly selected one of the N-tuple of resource IDs that are not already assigned to any of the other wireless devices.

12. The method according to claim 1, wherein, when all of the plurality of N-tuples of resource IDs have been assigned to the other wireless devices, the wireless device is configured with one of the plurality of N-tuples of resource IDs which have been assigned to fewest of the other wireless devices.

13. The method according to claim 1, wherein, when all of the plurality of N-tuples of resource IDs have been assigned to the other wireless devices, the data structure is expanded with at least one further N-tuple of resource IDs, and the wireless device is configured with one of the at least one further N-tuple of resource IDs.

14. The method according to claim 1, wherein said selecting is repeatedly performed at each downlink scheduling opportunity of the wireless device.

15. The method according to claim 1, wherein $N \geq 4$.

16. The method according to claim 1, wherein each resource ID defines a physical resource.

17. The method according to claim 1, wherein the uplink reporting is on a physical uplink control channel (PUCCH).

18. The method according to claim 17, wherein each N-tuple of resource IDs defines a PUCCH resource set.

19. The method according to claim 1, wherein the uplink reporting pertains to acknowledgement (ACK) and negative acknowledgement (NACK) feedback.

20. The method according to claim 1, wherein the uplink reporting pertains to reporting of channel state information (CSI).

21. A network node for scheduling resource IDs for uplink reporting from a wireless device, the network node comprising processing circuitry, the processing circuitry being configured to cause the network node to:

upon connection setup of the wireless device, configure the wireless device with an N-tuple of resource IDs, the N-tuple of resource IDs being assigned to the wireless device for uplink reporting, wherein the N-tuple of resource IDs is selected from a data structure holding a plurality of N-tuples of resource IDs, each N-tuple defining a unique combination of the resource IDs;

upon downlink scheduling of the wireless device, select one of the resource IDs of the configured N-tuple of resource IDs; and provide information to the wireless device about the selected resource ID.

22. A non-transitory, computer-readable medium storing computer-executable instructions that, when executed by processing circuitry comprising a network node, configure the network node to:

upon connection setup of a wireless device, configure the wireless device with an N-tuple of resource IDs, the N-tuple of resource IDs being assigned to the wireless device for uplink reporting, wherein the N-tuple of resource IDs is selected from a data structure holding a plurality of N-tuples of resource IDs, each N-tuple defining a unique combination of the resource IDs;

upon downlink scheduling of the wireless device, select one of the resource IDs of the configured N-tuple of resource IDs; and provide information to the wireless device about the selected resource ID.

* * * * *

UNITED STATES PATENT AND TRADEMARK OFFICE
CERTIFICATE OF CORRECTION

PATENT NO. : 11,122,607 B2
APPLICATION NO. : 16/086110
DATED : September 14, 2021
INVENTOR(S) : Söderlund et al.

Page 1 of 1

It is certified that error appears in the above-identified patent and that said Letters Patent is hereby corrected as shown below:

In the Specification

In Column 4, Line 16, delete "fifth (5G)" and insert -- fifth generation (5G) --, therefor.

In Column 4, Line 23, delete "no" and insert -- 100 --, therefor.

In Column 10, Line 2, delete "no" and insert -- 110 --, therefor.

In Column 10, Line 7, delete "no" and insert -- 110 --, therefor.

Signed and Sealed this
Twenty-fourth Day of May, 2022

Katherine Kelly Vidal
*Director of the United States Patent and Trademark Office*